Figure 1:
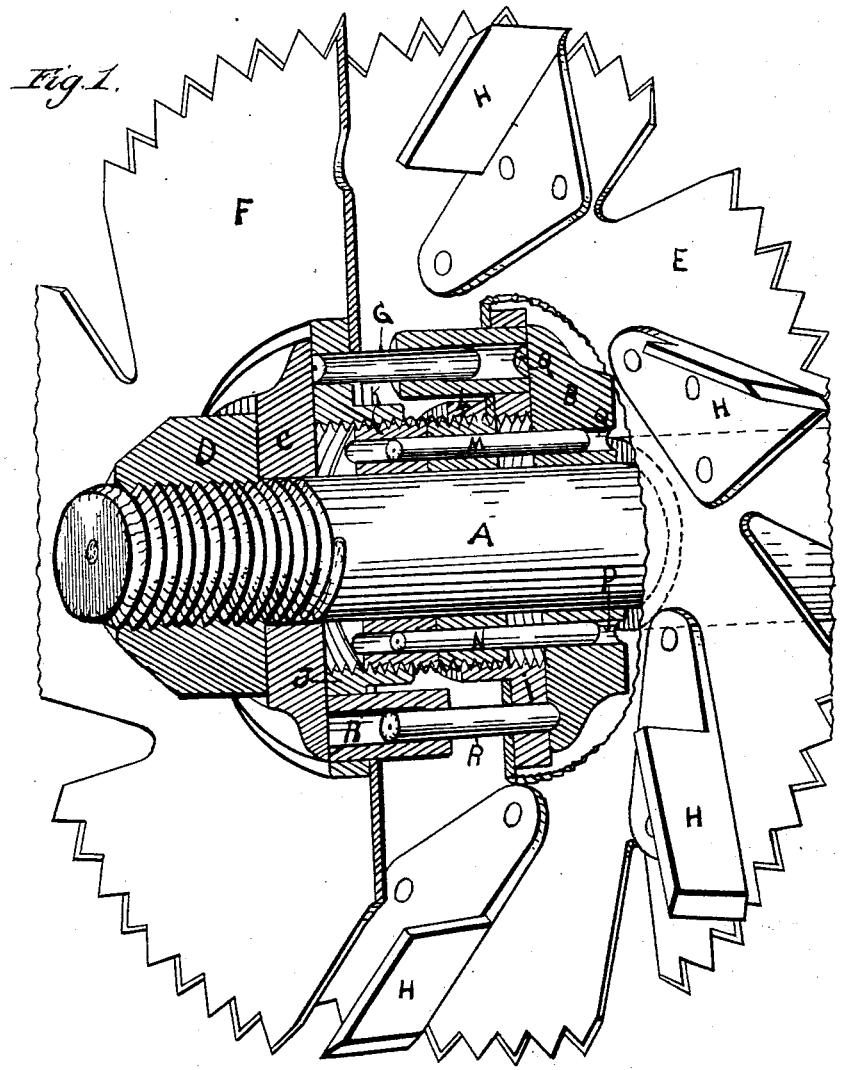

(No Model.)   4 Sheets—Sheet 1.

W. J. PERKINS.
DADO CUTTER AND TENONING MACHINE.

No. 588,082.   Patented Aug. 10, 1897.

WITNESSES:

INVENTOR

BY

ATTORNEY.

(No Model.) 4 Sheets—Sheet 2.
W. J. PERKINS.
DADO CUTTER AND TENONING MACHINE.
No. 588,082. Patented Aug. 10, 1897.
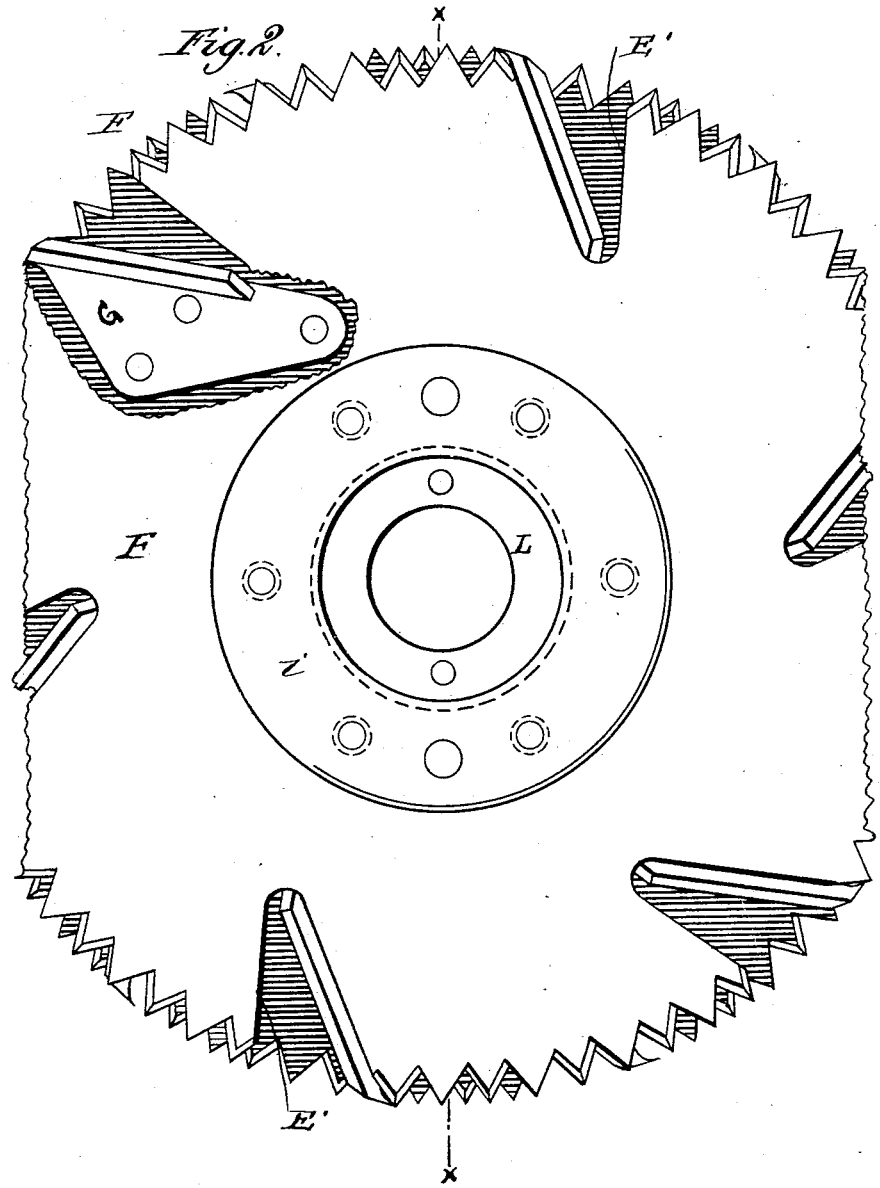
WITNESSES:
INVENTOR
BY
ATTORNEY.

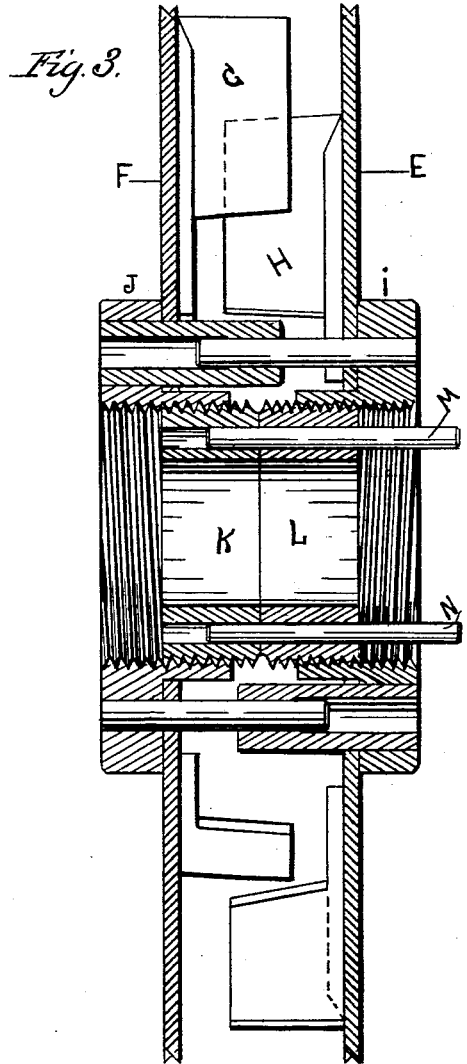
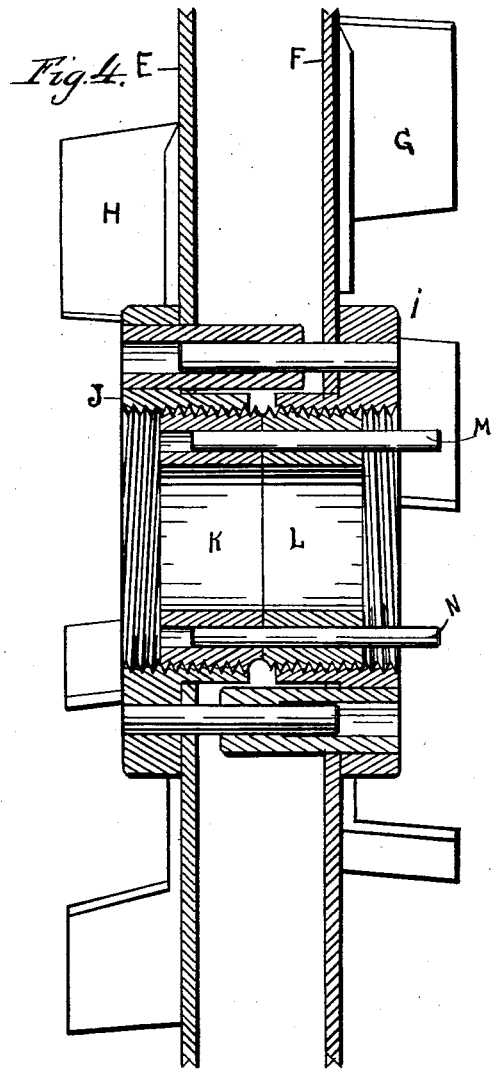

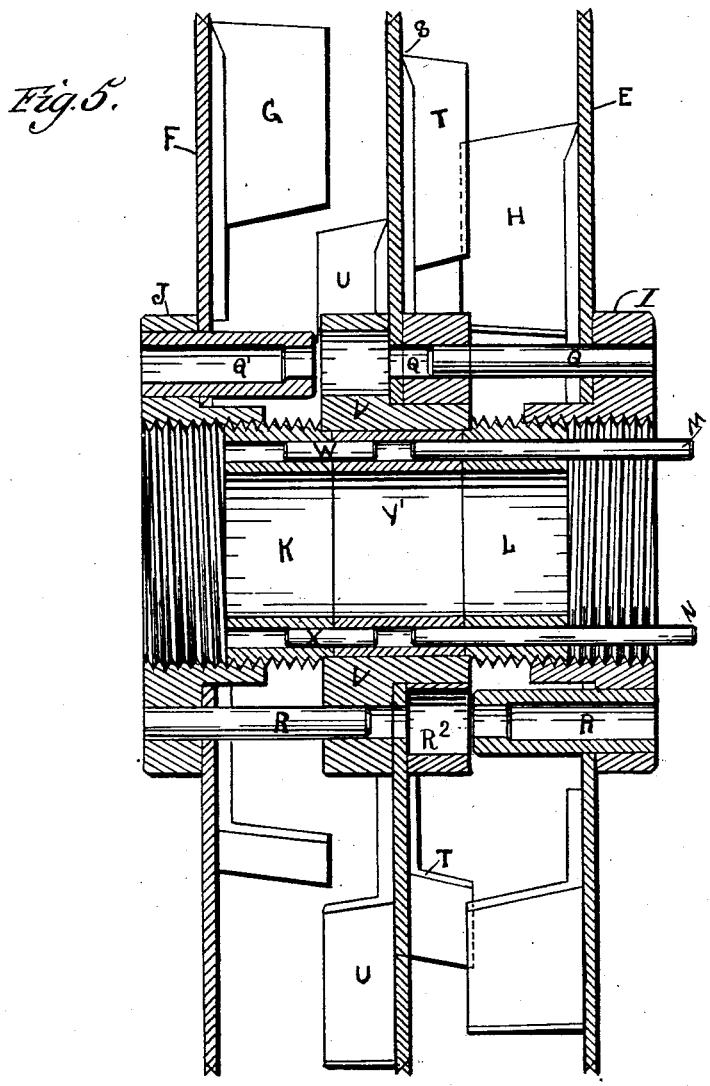

United States Patent Office.

WILLIS J. PERKINS, OF GRAND RAPIDS, MICHIGAN.

DADO-CUTTER AND TENONING-MACHINE.

SPECIFICATION forming part of Letters Patent No. 588,082, dated August 10, 1897.

Application filed August 2, 1895. Serial No. 558,022. (No model.)

*To all whom it may concern:*

Be it known that I, WILLIS J. PERKINS, a citizen of the United States, residing at the city of Grand Rapids, in the county of Kent and State of Michigan, have invented a certain new and useful Dado-Cutter and Tenoning-Machine, of which the following is a specification.

My invention relates to certain new and useful improvements in dado-cutters and tenoning-machines; and the objects of my invention are, first, to produce a dado-cutter or tenoning-machine of the smallest number of parts and having a maximum amount of expansion; second, to facilitate the work of expanding and adjusting the dado-cutters and saws and to lessen the time required to sharpen the same; third, to furnish means for quickly and readily adjusting and separating the dado-cutter into its several parts for the purpose of sharpening; fourth, to so construct the dado-cutter that it will always cut the required width, and so that the same can be taken apart and put together without running the risk of changing the size of groove or tenon made by the dado-cutter; fifth, the arrangement of the parts so that it may be readily changed from a dado-cutter to a tenon-cutter by simply changing the relative position of parts; sixth, to so construct the parts that when it is desired to make a very wide groove a third and similar (or substantially similar) section may be introduced, thereby greatly increasing the range of work; seventh, to provide the maximum amount of shoulder and center cutting-surfaces; eighth, to construct the parts so that the greatest amount of range of movement of the cutters upon the arbor may be had, so that with two sets of cutting devices the maximum cut may be fully twice as great as the minimum cut. These objects I accomplish by means of the mechanism illustrated in the accompanying drawings, in which—

Figure 1 is a perspective view of the dado-cutter with a portion broken away in order to show the internal construction. Fig. 2 is a side elevation, also with a portion broken away, so as to show one of the cutting-knives which is attached to the saw. Fig. 3 is a longitudinal sectional view on line X X of Fig. 2. Fig. 4 is also a longitudinal sectional view on the same line, (X X of Fig. 2,) with the saws and cutters transposed, so that the cutters extend away from each other instead of toward each other. Fig. 5 is also a sectional view on line X X of Fig. 2, with an intermediate saw placed between the outer saws for the purpose of obtaining greater expansion of the dado-cutter in order to cut a wide groove.

Similar letters refer to similar parts throughout the several views.

A shows the saw-arbor, which may be constructed in any ordinary form. In the drawings I have shown the arbor adapted for a single dado-cutter—that is, a dado composed of two or more parts or sections; but with slight modifications a plurality or series of these dado-cutters or tenon-cutters may be readily mounted upon the same arbor and adjusted in the manner hereinafter described, each of said tenons being adjusted separately. Attached to said arbor or integral therewith is the collar B. The loose collar C and a clamping screw-threaded nut D are fitted onto the arbor A and are adapted to retain the saws in position.

E and F represent two saws having attached thereto or integral with their surfaces a series of cutting-knives. One series of cutting-knives is shown by G and one by H. As each knife cuts across the entire surface represented by its width the sum-total of the cutting-surfaces is in excess of that furnished by any system of inclined or angling saws. The surfaces of the saws E and F are cut away at regular intervals, as shown by E', the balance of the saw being provided with shoulder-cutting teeth. The knives G on the saw F fit into the recesses E' in the saws E, while the knives or cutters H on the saw E fit into corresponding recesses or openings in the saw F. The saws E and F are preferably respectively attached or fastened securely to collars I and J. Instead of attaching the saws to the collars they may be formed integral therewith. I prefer to fasten the saws and collars together by means of screws or bolts, but any other suitable and efficient means may be used for making such attachment.

The saws E and F are preferably so constructed that their positions may be reversed—that is, the saw E may be so constructed where it is attached to the collar I that it may be transposed and attached to the collar J, while the saw F may be in turn attached in a similar manner to the collar I. When so changed, the series of knives H and G would project outwardly, as shown in Fig. 4, and the dado-cutter would then be transformed into a tenon cutting or tonguing device, the two saws cutting the width of the tenon or tongue, while the knives would cut shoulders of the tenon or tongue. This transposition would not in any way affect or alter the adjusting mechanism for expanding the dado by separating the saws or from drawing the same together, as hereinafter described, and this feature would be as necessary for the purpose of gaging the width of the tenon or tongue to be cut as when the device is used as a dado-cutter.

The collars I and J are provided with screw-threads on their inner diameter which engage with screw-threads on the nuts K and L, one of said nuts preferably having a right-hand thread on its periphery. These nuts K and L turn with the arbor A, said nuts K and L being fastened together by means of any suitable key or other device which may be employed for such purpose. In the example of my invention shown in the drawings M and N are made rigid in the nuts L and fit loosely in the nut K, having a sliding bearing in nut K. The collar B on the saw-arbor A, I provide with two holes or recesses (shown by O and P) and into which fit the outer ends of the pins M and N, which have a sliding bearing therein. The pins M and N maintain the nuts K with the collar B in the same peripheral relation to each other at all times—that is, one cannot turn without the other, but they allow the nuts K and L to move away from the surfaces of the collar B as the saws E and F are spread apart for the purpose of increasing the width of the dado-groove, and also allow them to be moved toward the said collar B as the saws approach each other when it is desirable to lessen the width of the dado-groove.

Q and R are two pins, preferably made fast in opposite saws and sliding in the sockets or holes Q' and R'. The sockets are made fast in the opposite saws to which the pins are fastened, and said pins Q and R prevent the saws E and F from changing their relative peripheral relations—that is, prevent one saw from turning without the other saw rotating to the same extent, but they permit of the adjustment of the saws longitudinally along the arbor for the purpose of increasing or diminishing the width of the cutting-surface of the dado. When the cutters are adjusted to remove the minimum amount of stock or to make the narrowest dado-groove, the inner jaws of the series of cutters G and H preferably project through the openings in the saws E and F, as above described, so that the projections or knives have their ends flush with the outer surfaces of their corresponding saws. This permits of an expansion equal to twice the minimum cut or groove—that is, with two saws and two sets of cutters the maximum cut or groove is double the minimum cut or groove.

In Fig. 5 I have shown an intermediate saw S with a series of cutting-knives T and U on each of its surface or faces; but instead of using the double series a single series may be used, it being evident that the double series gives greater breadth of expansion to the dado-cutter. These cutting-knives T and U are so placed that they fit as the dado is contracted into the places between the inwardly-projecting cutting-knives of the saws E and F. The saw S is preferably mounted upon a flange V. Said flange V is preferably provided with two holes or recesses into which the pins M and N in nuts L are adapted to fit, and pins W and X are fastened and fit into nut L. By the use of this third saw, with its cutting-knives located between the other two in the manner described, I have not interfered in any way with the facility and ease of adjustment of the dado-cutter head for broad or narrow grooves. Neither have I increased the labor required to sharpen or put together these dado-cutting devices, for the three sections or parts, as shown in Fig. 5, can be as readily separated and taken apart as the two parts shown in Fig. 3.

I have referred to the device when used with the saws reversed and the cutting-knives projecting outwardly as a "tenoning-machine." It will be evident that the same may be used for cutting tongues, for tenons, for matching lumber, or for any other analogous purpose, and in cases where the same may be found useful my device could be used for raising ornamental ridgework and beadwork. The process of cutting has been fully described above and the desirability of adjustment and purposes subserved by such adjustment.

The operation of adjusting my dado-cutter is as follows: The nuts K and L being held stationary with the arbor A by means of suitable connections, shown by the pins M and N, fitting into the recesses O and P, allow the saws to be moved toward and away from each other by merely slackening the nut D and then turning the saws E and F upon the sleeve-nuts K and L in one direction for the purpose of bringing them toward each other when it is desired to make a narrow groove, and in the opposite direction when the saws are moved from each other in order to make a broad groove. In sharpening the saws it is only necessary to remove the cutter from the driving arbor or mandrel, when the two parts may be readily and quickly taken apart—that is, the saws with their respective holding-flanges and sleeve-nuts may be spread apart by simply sliding the pins M and N out of their respective sockets. This does not necessitate the change of the relative position of the sleeve-nuts K and L with their respective flanges I and J. Therefore after the saws have been sharpened and restored to the driving-mandrel the width of the groove has not been changed or altered in any way.

I have shown in the example of my invention illustrated in the drawings two pins as a binding medium between the respective sleeve-nuts and the arbor. It will be evident that one pin in each case might answer the purpose, or more than two pins might be used, or other well-known suitable devices may be employed in their stead, so as to obtain the proper and predetermined peripheral relation between the several parts described.

I do not restrict myself to the exact forms of saws, cutters, or adjusting mechanism herein described, but reserve my right to any modification or variation of mechanical devices which may properly be used within the scope of my invention.

Having thus described my invention, what I claim to have invented, and desire to secure by Letters Patent, is—

1. The combination of two outer saws, two saw-supporting nuts, one for each saw, means for loosely connecting said nuts, two threaded nuts or sleeves on the arbor, one for each saw-supporting nut, a pin parallel with the axis and lying partly in and made fast to one of the saw-supporting nuts and having a sliding engagement with a socket in the other saw-supporting nut for attaching said saw-supporting nuts loosely and enabling them to be adjusted toward and from each other without changing their peripheral relations, and means for connecting said saws and arbor-nuts, substantially as described.

2. The combination of two saws or analogous cutting implements and intermediate overlapping cutting devices, a screw-threaded collar attached to each of said saws, means for adjusting said saws to and from each other upon a threaded sleeve, said saws adapted to be placed in reverse position so that the cutting-knives extend outwardly from each other, leaving a space between the saws, thereby adapting the same for use as a tenoning device, substantially as described.

3. In combination with two saws provided with threaded collars and a series of cutting-knives extending inwardly from their adjacent faces, an intermediate saw placed between said outer saws, having cutting-knives extending outwardly from its face, a loose connection between the said three collars, and a threaded sleeve with which the collars on the outer saws engage whereby the said outer saws may be adjusted to and from the inner or center saw, substantially as described.

In witness whereof I have hereunto set my hand and seal in the presence of two witnesses.

WILLIS J. PERKINS. [L. S.]

Witnesses:
EDWARD TAGGART,
CHRISTOPHER HONDELINK.